(12) United States Patent
Broste

(10) Patent No.: US 6,231,019 B1
(45) Date of Patent: May 15, 2001

(54) PIVOTABLE FEED BUCKET HOLDER

(76) Inventor: Wayne O. Broste, 27006-146th St., Zimmerman, MN (US) 55398

( * ) Notice: Subject to any disclaimer, the term of this patent is extended or adjusted under 35 U.S.C. 154(b) by 0 days.

(21) Appl. No.: 09/097,833

(22) Filed: Jun. 16, 1998

(51) Int. Cl.⁷ .................................................. A47K 1/08
(52) U.S. Cl. ................................. 248/312.1; 248/291.1; 248/311.2; D6/566
(58) Field of Search .......................... 248/312.1, 291.1, 248/311.2, 315, 312, 691, 207, 201, 214, 316.8, 294.1, 68.1, 74.1, 110; 211/65; 119/60, 61, 68; D6/566; 220/475, 478

(56) References Cited

U.S. PATENT DOCUMENTS

| D. 259,967 | * | 7/1981 | Ramsey | D30/2 |
| D. 392,487 | * | 3/1998 | Cambron | D6/546 |
| 1,157,333 | * | 10/1915 | Snell | 248/291.1 |
| 1,567,480 | * | 12/1925 | Wood | 248/291.1 X |
| 1,606,064 | * | 11/1926 | Evans | 248/312 |
| 2,584,644 | * | 2/1952 | Verdi | 211/65 |
| 2,968,462 | * | 1/1961 | Jones | 248/291.1 |
| 3,233,858 | * | 2/1966 | Benjamin | 248/311.2 |
| 5,139,222 | * | 8/1992 | Koorey et al. | 248/311.2 |

OTHER PUBLICATIONS

Valley Pet Supply, Bucket Holder Advertisement, undated.

* cited by examiner

Primary Examiner—Anita M. King
(74) Attorney, Agent, or Firm—Michael S. Sherrill

(57) ABSTRACT

A holder for a feed bucket, comprising (i) a low profile collar for holding a feed bucket, and (ii) an arbor, pivotably attached to the collar, for securing the collar to a vertical structure while permitting pivoting of the collar between a substantially vertical storage position and a substantially horizontal retention position.

5 Claims, 4 Drawing Sheets

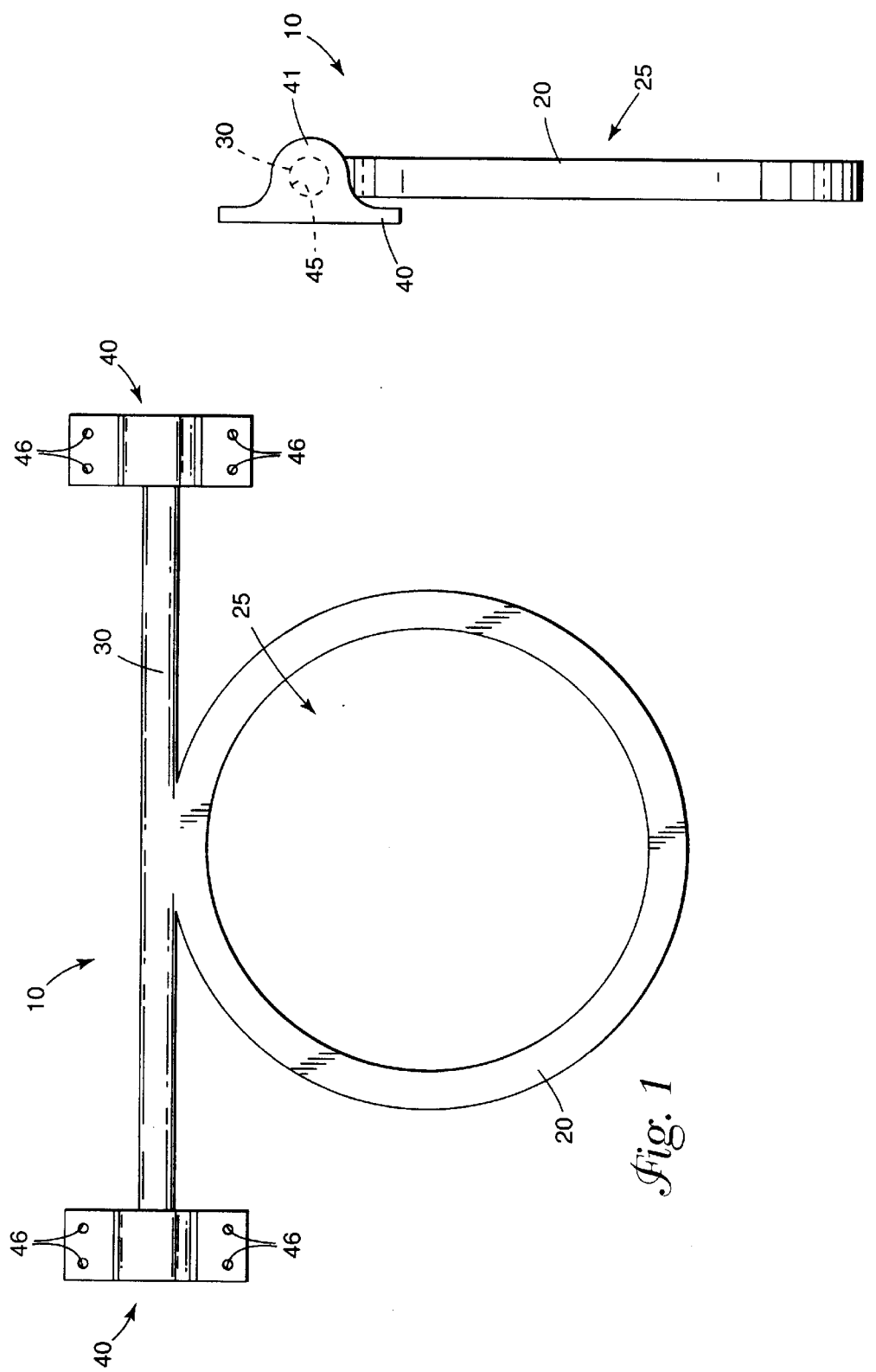

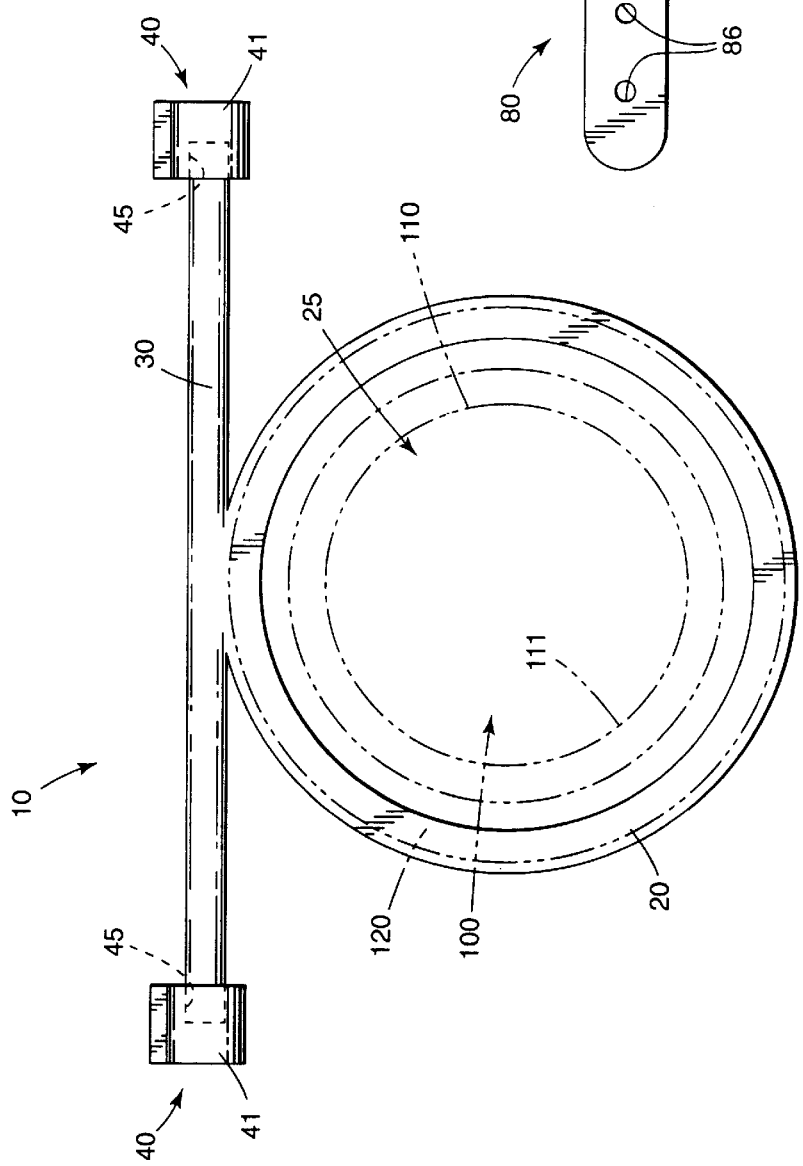
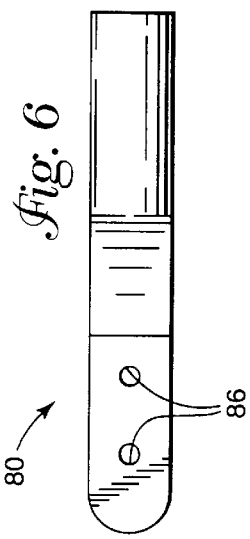
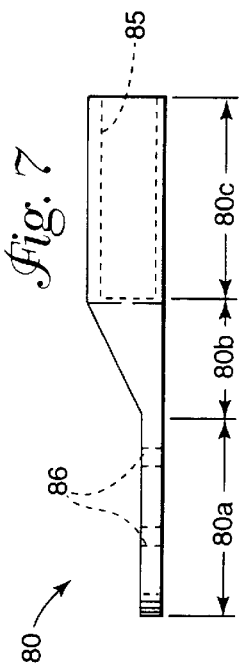

PIVOTABLE FEED BUCKET HOLDER

FIELD OF THE INVENTION

The invention relates to bucket holders, particularly those for holding feed buckets for livestock.

BACKGROUND

Livestock, particularly horses, are frequently fed grain and palletized supplements from a feed bucket, such as the conventional FORTIFLEX™ rubber feed buckets available from most agricultural supply stores.

The feed buckets are often used by simply placing the bucket upon the ground. While simple and convenient, this practice tends to result in a significant waste of feed as livestock will frequently knock the bucket over while feeding. In an effort to reduce such wastage, a number of different types of holders have been designed to hold a feed bucket in an elevated position where the bucket is less likely to be knocked over, such as disclosed in U.S. Design Pat. No. Des. 259,967.

While such holders constitute a significant advance over placing the feed bucket on the ground, such holders have not gained universal acceptance due to the cost of holder, the inconvenience of using the holder and/or the tendency of such holders to interfere with movement in the area in which the holder is mounted.

Accordingly, a substantial need exists for a compact and inexpensive feed bucket holder capable of securely retaining a conventional feed bucket.

BRIEF DESCRIPTION OF THE DRAWINGS

FIG. 1 is front view of one embodiment of the invention in the storage position.

FIG. 2 is a side view of the invention as shown in FIG. 1.

FIG. 5 is a top view of the invention shown in FIG. 3.

FIG. 6 is a front view of a second embodiment of a bracket.

FIG. 7 is a top view of the bracket shown in FIG. 6.

SUMMARY OF THE INVENTION

Figure 3:
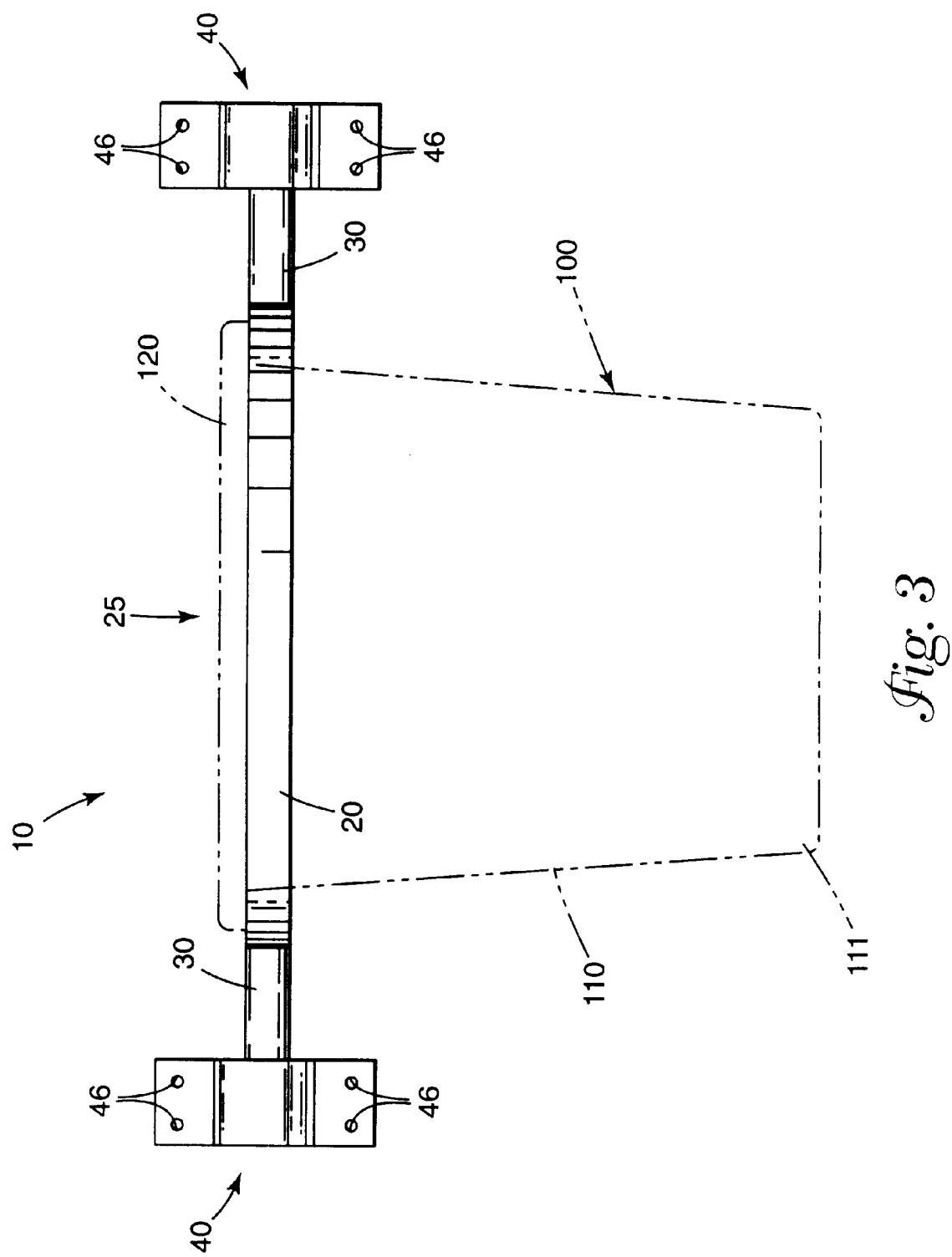
FIG. 3 is front view of the invention of FIG. 1 shown in the retention position with a feed bucket shown in phantom.

A holder for a feed bucket, comprising (i) a low profile means for holding a feed bucket, and (ii) a means, pivotably attached to the holding means, for securing the holding means to a vertical structure while permitting pivoting of the holding means between a substantially vertical storage position and a substantially horizontal retention position. In a preferred embodiment, the holder includes the holding means and the securing means without a means for locking the holding means in a pivoted position relative to the securing means.

DETAILED DESCRIPTION OF THE INVENTION INCLUDING A BEST MODE

Definitions

As utilized herein, including the claims, the phrase "low profile" is utilized in accordance with its standard dictionary definition of "having little height."

Nomenclature
10 Feed Bucket Holder
20 Collar
25 Central Opening in Collar
30 Arbor
40 Bracket
41 Protuberance on Bracket
45 Concavity in Protuberance
46 Screw Holes Through Bracket
80 Bracket
80a Flat Portion of Bracket
80b Transitional Portion of Bracket
80c Cylindrical Portion of Bracket
85 Channel in Bracket
86 Screw Holes Through Bracket
100 Feed Bucket
110 Body of Feed Bucket
111 Bottom Edge of Feed Bucket
120 Peripheral Lip on Feed Bucket Construction The feed bucket holder 10 includes (i) a low profile means for holding a feed bucket, and (ii) and a means, pivotably attached to the holding means, for securing the holding means to a vertical structure while permitting pivoting of the holding means between a substantially vertical storage position and a substantially horizontal retention position.

The holding means can be any structure capable of holding a conventional feed bucket 100, such as a FORTEX™ flat bucket, Fortex™ feed pan or Fortex™ stall feeder, in an elevated and upright position. Suitable holding means include rigid structures such as the collar 20 shown in FIGS. 1–5, and dynamic structures such as a pawl and ratchet tightenable pair of metal straps (not shown).

The collar 20 defines a central opening 25 configured and arranged to accommodate passage of the body 110 of a conventional feed bucket 100 while catching the peripheral lip 120 of the bucket 100 so as to supporting the bucket 100 in an upright position. As a general matter, the central opening 25 should have a diameter of between about 10–20 inches in order to accommodate typically sized feed buckets 100.

The securing means can be any structure capable of securing the holding means (e.g., collar 20) to a vertical structure (not shown) while permitting pivoting of the holding means between a substantially vertical storage position and a substantially horizontal retention position.

A particularly suitable securing means, shown in FIGS. 1–5, includes an arbor 30 and a pair of mounting brackets 40. The holding means (e.g., collar 20) is secured to the side of the arbor 30 proximate the longitudinal center of the arbor 30 and the longitudinal ends (unnumbered) of the arbor 30 supported by the brackets 40.

The holding means (e.g., collar 20) can be fixedly or removably attached to the arbor 30 by any suitable chemical or mechanical means, including specifically, but not exclusively, an adhesive layer, a weld line, a slot and tab construction, a nut and bolt combination, a clamp, etc.

The brackets 40 can be selected from any of the numerous well-known types of vertically mountable support brackets, so long as the brackets 40 can withstand the abuses commonly encountered by equipment used in connection with the raising of livestock (not shown), and so long as the brackets 40 permit at least a roughly 90° rotation of the arbor 30 along the longitudinal axis (not shown) of the arbor 30. Such rotation is necessary in order to permit pivoting of the holding means (e.g., collar 20) between a substantially vertical storage position (shown in FIGS. 1 and 2) and a substantially horizontal retention position (shown in FIGS. 3–5).

Figure 4:
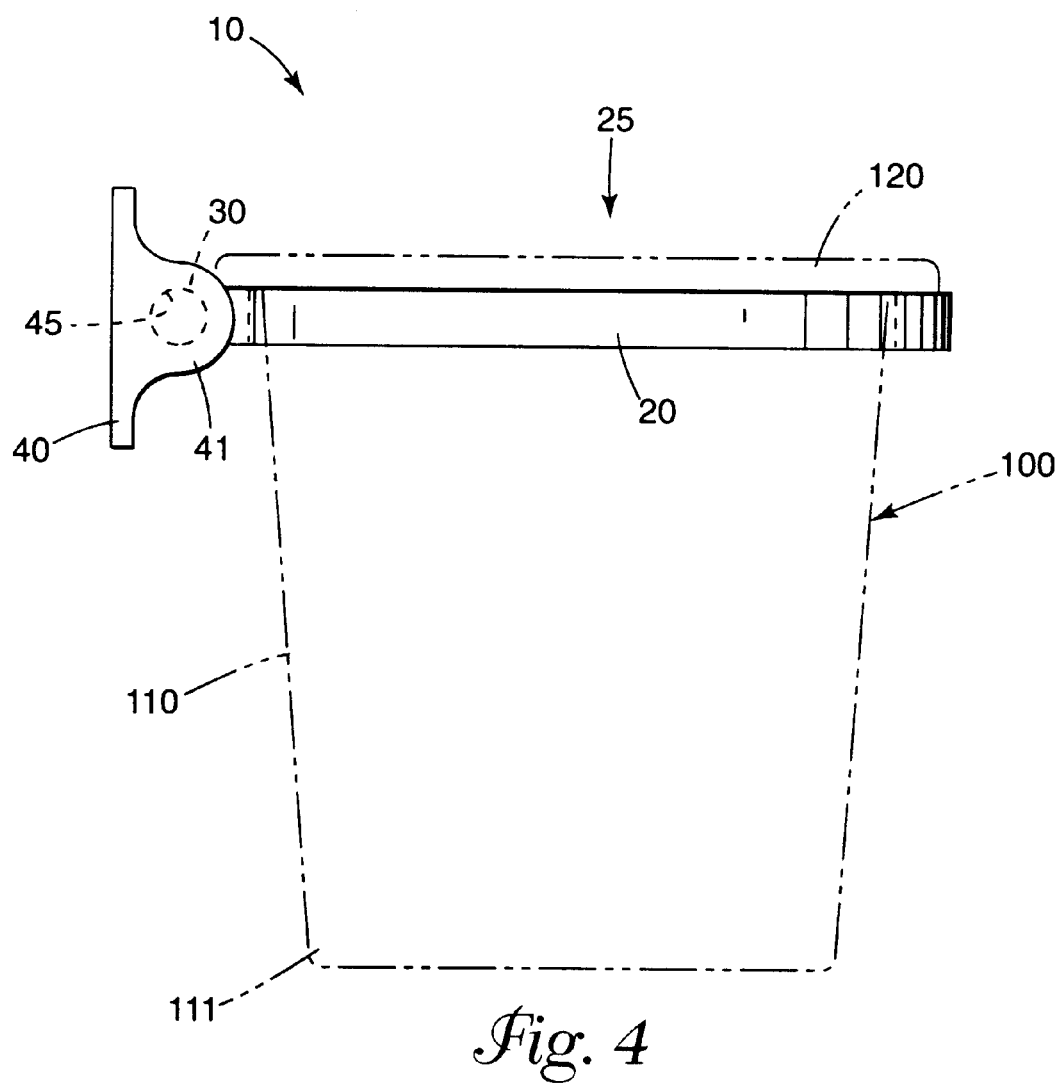
FIG. 4 is a side view of the invention shown in FIG. 3.

As shown in FIGS. 2 and 4, one embodiment of a suitable bracket 40 is a bracket having (i) a central protuberance 41 with a centrally positioned concavity 45 on the inside surface of the protuberance 41 for pivotably accommodating a longitudinal end of the arbor 30, and (ii) a plurality of holes 46 proximate each corner (unnumbered) of the bracket 40 for permitting passage of a screw (not shown) or similar fastener effective for mounting the bracket 40 to a vertical surface (not shown). Alternatively, the brackets 40 may be configured with a U-shaped hook (not shown) extending from the back (unnumbered) of each bracket 40 for permitting mounting of the brackets 40 to the cross-bars of a pipe corral, wood fence, stall door, etc.

A second embodiment of a suitable bracket 80 is shown in FIGS. 6 and 7. Bracket 80 is essentially a length of pipe having (i) a flat portion 80a at one end through which screw holes 86 have been drilled, (ii) a cylindrical portion 80c at the other end providing a cylindrical channel 85 for pivotably accommodating a longitudinal end of the arbor 30, and (ii) a transitional portion 80b wherein the configuration of the bracket 80 changes from flat to cylindrical. As with the first embodiment, the second embodiment of the brackets 80 may be configured with a U-shaped hook (not shown) extending from the back (unnumbered) of each bracket 80 for permitting mounting of the brackets 80 to the cross-bars of a pipe corral, wood fence, stall door, etc.

The feed bucket holder 10 can be constructed from any desired material, including specifically, but not exclusively, wood, metal such as steel, and plastic such as HDPE. Due to the significant abuse to which the feed bucket holder 10 is likely to be subjected, the holder 10 is preferably constructed from steel.

The holder 10 can be provided to an end user as (i) a fully assembled item requiring only mounting of the brackets 40 to a vertical surface, (ii) a partially assembled item (e.g., the collar 20 and arbor 30 molded as a single unitary piece with the end user mounting the brackets 40 to a vertical surface and inserting a longitudinal end of the arbor 30 into the concavity 45 of each bracket 40), or (iii) a kit requiring assembly of each separate piece with or without tools (e.g., the collar 20 provided with tabs (not shown) which snap into a slot (not shown) provided in the arbor 30, with the end user mounting the brackets 40 to a vertical surface, inserting a longitudinal end of the arbor 30 into the concavity 45 of each bracket 40, and then snapping the collar 20 onto the arbor 30).

Use

Use of the properly mounted feed bucket holder 10 involves the simple steps of (i) manually pivoting the collar 20 from a low profile storage position (shown in FIGS. 1 and 2) to an insertion position (shown in FIGS. 3–5), (ii) inserting a feed bucket 100 into the central opening 25 in the collar 20 from above until further downward movement of the feed bucket 100 is prevented by contact between the bucket 100 and the collar 20 (generally resulting from the peripheral lip 120 of the bucket 100 contacting the upper surface (unnumbered) of the collar 20), and then (iii) allowing the collar 20 to pivot back towards the storage position until a lower portion of the bucket 100 contacts the vertical surface (not shown) upon which the holder 10 is mounted (i.e., the bottom edge 111 of the bucket 100 when the vertical surface (not shown) is continuous) (hereinafter referenced as the "retention position").

When the feed bucket 100 is no longer needed, the bucket 100 may be removed from the holder 10 and the holder 10 stored away by simply (iv) pivoting the collar 20 back to the insertion position, (v) pulling the feed bucket 100 out of the central opening 25 in the collar 20, and then (vi) allowing the collar 20 to return to the storage position. When returned to the storage position, the holder 10 extends a modest distance from the vertical surface (not shown) to which it is mounted, preferably about 1 to 6 inches, most preferably about 2 to 4 inches.

I claim:

1. A kit capable of being assembled to form a holder for a feed bucket, comprising:

a low profile means for holding the feed bucket comprising a collar defining a central opening with a diameter of about 10–20 inches, wherein the collar and central opening are configured and arranged to hold the feed bucket inserted through the central opening; and a securing means pivotally attachable to the low profile holding means of (i) an arbor having first and second longitudinal ends, and a means proximate the longitudinal center of the arbor for attaching the arbor to the low profile holding means, (ii) a first bracket configured and arranged to support the first longitudinal end of the arbor, and (iii) a second bracket configured and arranged to support the second longitudinal end of the arbor;

wherein the low profile holding means is pivotable between a substantially vertical storage position and a substantially horizontal retention position such that the securing means and the low profile holding means are configured and arranged so that the vertical storage position will be below the horizontal retention position when the holder is assembled upon a vertical structure.

2. The kit of claim 1 wherein the attaching means fixedly attaches the arbor to the low profile holding means.

3. A holder for a feed bucket, comprising:

(a) a low profile means for holding the feed bucket comprising a collar defining a central opening with a diameter of between about 10–20 inches, wherein the collar and central opening are configured and arranged to hold the feed bucket inserted through the central opening; and (b) a securing means pivotally attached to the low profile holding means including (i) a pair of brackets, and (ii) an arbor having first and second longitudinal ends, wherein the arbor is pivotably supported, proximate each longitudinal end, to one of the brackets, and attached to the low profile holding means intermediate the brackets;

wherein the securing means secures the low profile holding means to a vertical structure while permitting pivoting of the low profile holding means between a substantially vertical storage position and a substantially horizontal retention position, such that the vertical storage position is below the horizontal retention position.

4. The holder of claim 3 wherein the low profile holding means is fixedly attached to the arbor.

5. A kit capable of being assembled to form a holder for a feed bucket, comprising:

(a) a low profile means for holding the feed bucket comprising a collar defining a central opening with a diameter of about 10–20 inches, wherein the collar and central opening are configured and arranged to hold the feed bucket inserted through the central opening, the holding means fixedly attached to an arbor having first and second longitudinal ends;

(b) a first bracket configured and arranged to support the first longitudinal end of the arbor; and (c) a second bracket configured and arranged to support the second longitudinal end of the arbor;

wherein the low profile holding means fixedly attached to the arbor is pivotable between a substantially vertical storage position and a substantially horizontal retention position such that the securing means and the low profile holding means are configured and arranged so that the vertical storage position will be below the horizontal retention position when the holder is assembled upon a vertical structure.

* * * * *